Figure 1:
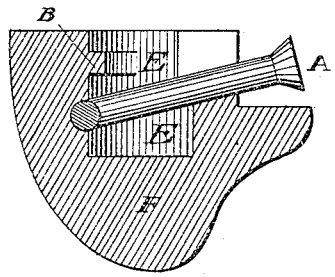

No. 787,352. PATENTED APR. 18, 1905.
C. T. CAMPBELL.
ARTIFICIAL TEETH.
APPLICATION FILED MAR. 28, 1904.

Witnesses,

Inventor.
Olive Thomas Campbell

No. 787,352. Patented April 18, 1905.

UNITED STATES PATENT OFFICE.

COLIN THOMAS CAMPBELL, OF KENTVILLE, CANADA.

ARTIFICIAL TEETH.

SPECIFICATION forming part of Letters Patent No. 787,352, dated April 18, 1905.

Application filed March 28, 1904. Serial No. 200,467.

*To all whom it may concern:*

Be it known that I, COLIN THOMAS CAMPBELL, dentist, of the town of Kentville, in the county of Kings and Province of Nova Scotia, Canada, have invented certain new and useful Improvements in Vulcanite Teeth; and I do hereby declare that the following is a full, clear, and exact description of the same.

My invention relates to improvements in vulcanite teeth in which a cavity-tooth operates in conjunction with a removable U-shaped metal spring-pin; and the objects of my invention are, first, to effect a strong and secure attachment of the tooth to the plate, and, second, to lessen the chances of cracks in the tooth caused by the insertion of the pin.

I attain the objects of my invention by the mechanism illustrated in the drawings filed herein on the 28th day of March, 1904, Serial No. 200,467, in which—

Figure 2:
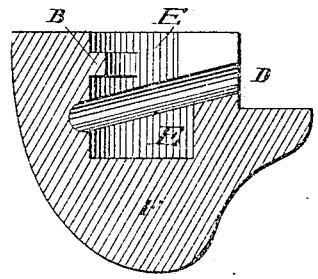
Figure 3:
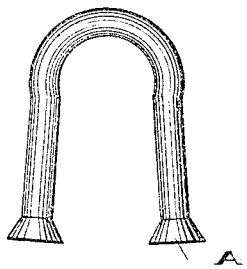
Figure 4:
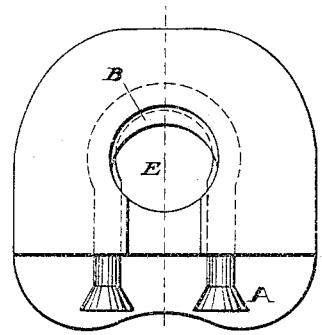
Figure 5:
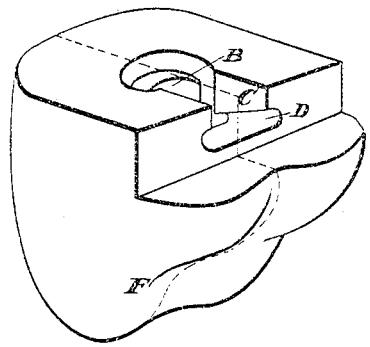

Figure 1 is a cross-section of the entire tooth, showing one-half of the pin in place and one-half the concave surface or cavity in the tooth and one-half of a projection in the cavity. Fig. 2 is a cross-section of the entire tooth with the pin removed and showing one-half of the groove in which the pin rests and one-half of the concave surface or cavity in the tooth and one-half of a projection in the cavity. Fig. 3 is an elevation of the entire pin. Fig. 4 is a plan of the tooth with the pin inserted and showing the relative position of all the parts, and Fig. 5 is a general view of the tooth with the pin removed.

Similar letters refer to similar parts throughout the several views.

A is the pin. B is a projection in the cavity E. D is a groove in which the pin rests. C is an aperture opening into the cavity E. E is the central cavity, and F is the thick part of the tooth. The broken line through the center of Figs. 4 and 5 indicate the plane upon which the sectional views are taken.

The pin A is made of tempered metal and is plated to prevent corrosion and when separated from the tooth the ends spring slightly away from the parallel position, as shown in Fig. 3.

The cavity E is circular in shape and extends from the base of the tooth downward, as shown in Figs. 1, 2, and 5.

The aperture C extends from the palatal or lingual surface of the tooth and opens into the cavity E, as shown in Fig. 5.

The groove D extends obliquely across the tooth and around the walls or sides of the aperture C and cavity E, as shown in Fig. 2.

The projection B into cavity E is quarter-moon in shape and is placed just above the groove D, as shown in Figs. 1, 2, 4, and 5.

In order to place the pin in the tooth, the terminal points of the pin are bent till they converge, and then the pin may be slid into the groove D, when the ends of the pin will when released spring apart and press against the walls of the groove D.

When the pin is in place, its ends project from the tooth, as in the ordinary pin-tooth, as shown in Figs. 1 and 4. The pin when placed in the tooth fills up that portion of the groove D which circles cavity E and slightly projects into cavity E, but does not quite fill the remaining portion of groove D, which is made in the walls of aperture C, as shown in Fig. 4. The circular portion of the pin rests in that portion of groove D which circles cavity E, and the arms of the pin rest in that portion of groove D which is made in the walls or sides of aperture C.

The cavity E and aperture C are when the tooth is set in the plate entirely filled with the vulcanized rubber of the plate, and the portions of the pin which project from the tooth are surrounded with the vulcanized rubber of the plate.

The projection of pin A into cavity E and the projection B holds the rubber of the plate firmly in the tooth on account of the rubber hardening under and around these projections and preventing it from moving in any direction.

The pin is held firmly in place by its own pressure against the walls of groove D and by the vulcanized rubber of the plate, which fills the interior of the tooth and surrounds those portions of the pin which project into cavity E. The tooth is therefore fastened to the plate by the vulcanized rubber of the plate, portions of which enter and fill the cavities of the tooth and surround the portions of the pin which project from the tooth, thus effecting a strong and secure attachment of the tooth to the plate, and as the pin is not fused in the tooth there is lessened the chances of cracks in the tooth caused by the insertion of the pin.

I am aware that diatoric teeth having different-shaped cavities and pin-teeth in which the pin is inseparable from the tooth have been used separately prior to my invention; but I am not aware that any tooth combining the two features has ever been used or patented.

What I claim as my invention, and desire to secure by Letters Patent, is—

The combination, in vulcanite teeth, of a tooth having a perpendicular, circular, central cavity extending from the base of the tooth downward into the tooth, and an aperture extending at right angles from the central cavity outward to the palatal or lingual surface, and a groove circling both the central cavity and aperture obliquely, and a quarter-moon-shaped projection in the central cavity above the groove, with a removable U-shaped metallic spring-pin which fits into the groove, all as substantially set forth.

Kentville, Nova Scotia, March 22, 1904.

COLIN THOMAS CAMPBELL.

In presence of—
C. A. TUFTS,
STEVE GILLINGHAM.